US012566518B1

(12) United States Patent
Shen

(10) Patent No.: US 12,566,518 B1
(45) Date of Patent: Mar. 3, 2026

(54) SYSTEM AND METHOD FOR POWER EFFICIENT TOUCH SENSING

(71) Applicant: Synaptics Incorporated, San Jose, CA (US)

(72) Inventor: Guozhong Shen, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/816,948

(22) Filed: Aug. 27, 2024

(51) Int. Cl.
 *G06F 3/041* (2006.01)
 *G06F 3/044* (2006.01)
(52) U.S. Cl.
 CPC ...... *G06F 3/041661* (2019.05); *G06F 3/0446* (2019.05)
(58) Field of Classification Search
 CPC .......................... G06F 3/041661; G06F 3/0446
 See application file for complete search history.

(56) References Cited

U.S. PATENT DOCUMENTS

| | | | |
|---|---|---|---|
| 9,058,071 B2 | 6/2015 | Esteve | |
| 2013/0100071 A1 | 4/2013 | Wright et al. | |
| 2014/0092033 A1 | 4/2014 | Chang et al. | |
| 2018/0059866 A1* | 3/2018 | Drake .................. | G06F 3/0446 |
| 2018/0088733 A1* | 3/2018 | Syed .................. | G06F 3/04166 |
| 2020/0192544 A1* | 6/2020 | Chung ................ | G06F 3/04166 |
| 2021/0191574 A1 | 6/2021 | Sleeman et al. | |
| 2023/0076426 A1* | 3/2023 | Nakano .................. | G06F 3/047 |
| 2024/0036694 A1 | 2/2024 | Rosenberg et al. | |

FOREIGN PATENT DOCUMENTS

| | | |
|---|---|---|
| CN | 112235673 B | 7/2019 |
| KR | 20150130554 A | 11/2015 |
| KR | 20200101265 A | 8/2020 |

OTHER PUBLICATIONS

International Search Report, dated Dec. 18, 2025, in International Patent Application No. PCT/2025/043124, filed Aug. 22, 2025.

* cited by examiner

*Primary Examiner* — Liliana Cerullo

(74) *Attorney, Agent, or Firm* — Leydig, Voit & Mayer, Ltd.

(57) ABSTRACT
A system and method for touch sensing using an input device is provided. The input device comprises a display and a touch sensor. The touch sensor has a plurality of sensor electrodes and a sensor circuit. The plurality of sensor electrodes are configured to perform touch sensing for a sensing duration based on a set of sensing signals generated by the sensor circuit. The sensor circuit is configured to obtain a sub-frame based on resulting signals received from the plurality of sensor electrodes based on a subset of sensing signals in the sensing duration; determine whether the sub-frame meets a condition to terminate the touch sensing for the sensing duration; and in response to determining that the sub-frame meets the condition to terminate the touch sensing for the sensing duration, terminate the touch sensing for the sensing duration.

20 Claims, 7 Drawing Sheets

600

Obtain a sub-frame for condition checking ⟍ 602

Determine whether to continue or terminate full frame sensing ⟍ 604

Determine to continue the full frame sensing or terminate the full frame sensing ⟍ 606

Update the baseline for the sub-frame ⟍ 608

600

Obtain a sub-frame for condition checking ⟳ 602

Determine whether to continue or terminate full frame sensing ⟳ 604

Determine to continue the full frame sensing or terminate the full frame sensing ⟳ 606

Update the baseline for the sub-frame ⟳ 608

SYSTEM AND METHOD FOR POWER EFFICIENT TOUCH SENSING

TECHNICAL FIELD

This disclosure generally relates to touch sensors.

BACKGROUND

Input devices such as touch sensor devices (also commonly called touchpads, touch sensors, or proximity sensor devices), are used in a variety of electronic systems. Touch sensor devices typically include a sensing region, often demarked by a surface, in which the touch sensor device determines the presence, location and/or motion of one or more input objects, typically for purposes of allowing a user to provide user input to interact with the electronic system. The input device may be a touchscreen that includes a plurality of electrodes and is also capable of allowing the user to provide user input to interact with the electronic system. In recent years, foldable devices having touch-screens or other types of capacitive sensors have been developed. Touch sensors may be integrated in a display such as, for example, commonly found in mobile phones, laptops and similar devices.

There is a need in the field to enhance the performance of touch sensor devices in order to improve the user experience.

SUMMARY

In an exemplary embodiment, a touch sensor is provided. The touch sensor has a plurality of sensor electrodes and a sensor circuit. The plurality of sensor electrodes are configured to perform touch sensing for a sensing duration based on a set of sensing signals generated by the sensor circuit. The sensor circuit is configured to obtain a sub-frame based on resulting signals received from the plurality of sensor electrodes based on a subset of sensing signals in the sensing duration; determine whether the sub-frame meets a condition to terminate the touch sensing for the sensing duration; and in response to determining that the sub-frame meets the condition to terminate the touch sensing for the sensing duration, terminate the touch sensing for the sensing duration. The condition corresponds to a baseline and a threshold.

In a further exemplary embodiment, an input device is provided. The input device comprises a display and a touch sensor. The touch sensor has a plurality of sensor electrodes and a sensor circuit. The plurality of sensor electrodes are configured to perform touch sensing for a sensing duration based on a set of sensing signals generated by the sensor circuit. The sensor circuit is configured to obtain a sub-frame based on resulting signals received from the plurality of sensor electrodes based on a subset of sensing signals in the sensing duration; determine whether the sub-frame meets a condition to terminate the touch sensing for the sensing duration; and in response to determining that the sub-frame meets the condition to terminate the touch sensing for the sensing duration, terminate the touch sensing for the sensing duration. The condition corresponds to a baseline and a threshold.

In a yet further exemplary embodiment, a method for touch sensing is provided. The method is performed during a sensing duration corresponding to a set of sensing signals. The method includes driving a plurality of sensor electrodes based on the set of sensing signals; obtaining a sub-frame based on resulting signals received from the plurality of sensor electrodes based on a subset of sensing signals in the sensing duration; determining whether the sub-frame meets a condition to terminate the touch sensing for the sensing duration, the condition corresponding to a baseline and a threshold; and in response to determining that the sub-frame meets the condition to terminate the touch sensing for the sensing duration, terminating the touch sensing for the sensing duration.

DESCRIPTION

The following detailed description is exemplary in nature and is not intended to limit the disclosure or the application and uses of the methods and systems described herein. Furthermore, there is no intention to be bound by any expressed or implied theory presented in the preceding technical field, background, summary and brief description of the drawings, or the following detailed description.

Exemplary systems and methods discussed herein provide for power efficient touch sensing. In conventional approaches, each sensing instance may necessitate running a complete sensing pipeline, even when full sensing might not be required. For example, when negligible changes are detected in the touch area over certain time periods, performing a full sensing cycle can be inefficient. According to exemplary embodiments, a touch sensing method and system use a subset of resulting signals from the complete sensing pipeline to perform a condition check. Based on a condition check, the method and system determine whether to continue or terminate the remaining processes in the sensing pipeline. This approach can reduce power consumption in various suitable modes, such as active mode, thereby enhancing the performance of touch sensor devices.

Figure 1:
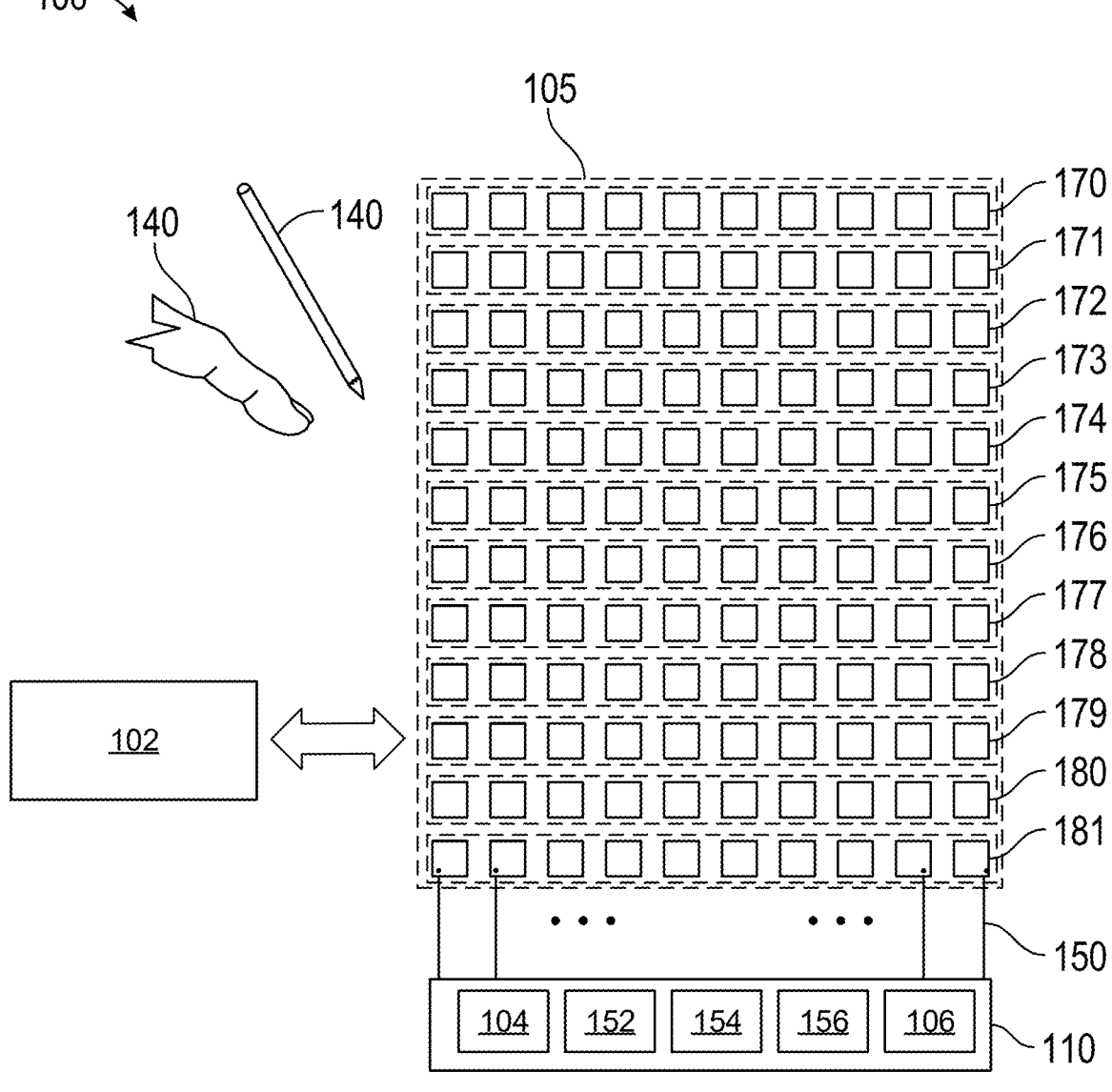
FIG. 1 is a block diagram of an input device, according to one or more embodiments.

FIG. 1 illustrates an input device 100 configured to provide input to an electronic system 102, which can be used to implement touch sensing in at least certain modes as described herein. Some non-limiting examples of electronic systems include desktop computers, laptop computers, net-book computers, tablets, terminals, kiosks, mobile (e.g., cellular) phones, automotive multimedia centers and internet of things (IoT) devices, among others. The input device 100 may be part of the electronic system 102 or may be a separate component communicatively coupled to the electronic system 102.

The input device 100 includes a processing system 110 and sensor electrodes 105. The processing system 110 operates the sensor electrodes 105 to detect one or more input objects 140 or other condition in a sensing area of the input device 100. Example input objects 140 include fingers and styli, as shown in FIG. 1. Input objects may include parts of a hand other than a finger, such as a palm or side of the hand.

The sensing area of the input device 100 encompasses any space above, around, in and/or near the input device 100 in which the input device 100 is able to detect user input, e.g., user input provided by one or more input objects 140. In certain embodiments, the input device 100 is able to detect other conditions, such as an angle at which a foldable device is open.

The sensor electrodes 105 are coupled to the processing system 110 via conductive paths, e.g., traces 150. An exemplary pattern of the sensor electrodes 105 illustrated in FIG. 1 comprises an array of sensor electrodes 105 disposed in a plurality of rows and columns. In one example, the sensor electrodes 105 are disposed in rows, e.g., rows 170-181. In other embodiments, the sensor electrodes may be disposed in columns. It is contemplated that the sensor electrodes 105 may be arranged in other patterns, such as polar arrays, repeating patterns, non-repeating patterns, non-uniform arrays, or other suitable arrangement. The sensor electrodes 105 may have any suitable shape, such as circular, rectangular, diamond, star, square, nonconvex, convex, noncon-cave, concave, or other geometry.

The sensor electrodes 105 may be disposed in a common layer. For example, the sensor electrodes 105 may be disposed on a first side of a common substrate. In other embodiments, the sensor electrodes 105 may be disposed in two or more layers. For example, a portion of the sensor electrodes 105 may be disposed on a first layer and another portion of the sensor electrodes may be disposed on a second layer. The first and second layers may be disposed on different sides of a common substrate, or disposed on different substrates.

The sensor electrodes 105 may be comprised of a conductive material such as a metal mesh, indium tin oxide (ITO), or the like. Further, the sensor electrodes 105 are ohmically isolated from each other such that one or more insulators separate the sensor electrodes and prevent them from electrically shorting to each other.

The processing system 110 includes sensor circuitry 104. Further, the processing system 110 may include a determination circuit 106. The processing system 110 is configured to operate the sensor electrodes 105 to detect one or more input objects 140 or other condition in the sensing area of the input device 100. The processing system 110 fully or partially resides in one or more integrated circuit (IC) chips. For example, the processing system 110 may include a single IC chip. Alternatively, the processing system 110 may include multiple IC chips. The processing system may also include one or more discrete circuits.

The sensor circuitry 104 is coupled to the sensor electrodes 105 via the routing traces 150 and is configured to drive the sensor electrodes 105 with sensing signals to detect one or more input objects 140 in the sensing area of the input device 100. The sensor circuitry 104 may also be configured to drive the sensor electrodes 105 with other signals, such as guarding signals and/or ground signals.

The sensor circuitry 104 includes digital and/or analog circuitry. For example, the sensor circuitry 104 comprises transmitter (or driver) circuitry configured to drive or transmit sensing signals onto the sensor electrodes 105 and receiver circuitry to receive resulting signals from the sensor electrodes 105. The transmitter circuitry may include one or more amplifiers and/or one or more modulators configured to drive sensing signals on to the sensor electrodes 105.

The processing system 110 may include analog-to-digital and/or digital-to-analog converters (ADCs and/or DACs) 154, and analog front ends (AFEs) 152 comprising, for example, integrators configured to receive resulting signals from the sensor electrodes 105. The processing system 110 may include compensation circuitry 156 configured to provide signals to compensate for background capacitance. The ADCs (and/or DACs) 154, AFEs 152 and compensation circuitry 156 may be part of the sensor circuitry 104 or may form different circuits.

The processing system 110 may perform any appropriate amount of processing on the electrical signals to translate or generate the information provided to the electronic system. For example, the processing system 110 may digitize analog signals received via the sensor electrodes 105 and/or perform filtering or conditioning on the received signals. In some aspects, the processing system 110 may subtract or otherwise account for a "baseline" associated with the sensor electrodes 105. For example, the baseline may represent a state of the sensor electrodes 105 when no user input is detected. In certain embodiments, the baseline may be updated to reflect a touch in a certain area of the touch sensor and may be used to detect a condition such as a non-moving finger or other input object, e.g., a stable touch. The information provided by the processing system 110 to the electronic system may reflect a difference between the signals received from the sensor electrodes 105 and a baseline associated with each sensor electrode 105.

The sensor circuitry 104 may drive the sensor electrodes 105 in various modes. In some modes, the sensor circuitry 104 may utilize all sensor electrodes 105 to detect an input object. In other modes, the sensor circuitry 104 may only utilize a subset of the sensor electrodes 105 to detect an input object.

In certain embodiments or modes, the sensor circuitry 104 drives a first one or more of the sensor electrodes 105 with a transcapacitive sensing signal and receives a resulting signal with a second one or more of the sensor electrodes 105 to operate the sensor electrodes 105 for transcapacitive sensing. Operating the sensor electrodes 105 for transcapacitive sensing detects changes in capacitive coupling between sensor electrodes 105 driven with a transcapacitive sensing signal and sensor electrodes 105 operated as receiver electrodes. The capacitive coupling may be reduced when an input object (e.g., the input object 140) coupled to a system ground approaches the sensor electrodes 105. Driving the sensor electrodes 105 with transcapacitive sensing signals comprises modulating the sensor electrodes 105 relative to a reference voltage, e.g., system ground. Transcapacitive sensing may be used in connection with a parallel touch sensing mode. However, it will be understood that transcapactive sensing is not limited to parallel touch sensing modes. For example, transcapacitive sensing may include driving rows of the sensor electrodes 105 with a transcapacitive sensing signal and reading columns of the sensor electrodes 105 to obtain resulting signals and/or vice versa.

The transcapacitive sensing signal is a periodic or aperiodic signal that varies between two or more voltages.

Further, the transcapacitive sensing signal typically has a frequency between 50 kHz and 1 MHz, but in other embodiments other frequencies may be utilized. The transcapacitive sensing signal may have a peak-to-peak amplitude in a range of about 1 V to about 10 V. However, in other embodiments, the transcapacitive sensing signal may have a peak-to-peak amplitude greater than about 10 V or less than about 1 V. Additionally, the transcapacitive sensing signal may have a square waveform, a sinusoidal waveform, triangular waveform, a trapezoidal waveform, or a sawtooth waveform, among others.

In some embodiments, operating the sensor electrodes 105 to receive resulting signals comprises holding the sensor electrodes 105 at a substantially constant voltage or modulating the sensor electrodes 105 relative to the transcapacitive sensing signal. A resulting signal includes effect(s) corresponding to one or more transcapacitive sensing signals, and/or to one or more sources of environmental interference, e.g., other electromagnetic signals.

In other embodiments or modes, the sensor circuitry 104 operates the sensor electrodes 105 for absolute capacitive sensing by driving a first one or more of the sensor electrodes 105 with an absolute capacitive sensing signal and receiving a resulting signal with the driven sensor electrodes 105. Operating the sensor electrodes 105 for absolute capacitive sensing detects changes in capacitive coupling between sensor electrodes 105 driven with an absolute capacitive sensing signal and an input object (e.g., the input object 140). The capacitive coupling of the sensor electrodes 105 driven with the absolute capacitive sensing signal is altered when an input object (e.g., the input object 140) coupled to a system ground approaches the sensor electrodes 105.

The absolute capacitive sensing signal is a periodic or aperiodic signal that varies between two or more voltages. Further, the absolute capacitive sensing signal typically has a frequency between about 50 kHz and about 1 MHz, but in other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal may have a peak-to-peak amplitude in a range of about 1 V to about 10 V. However, in other embodiments, the absolute capacitive sensing signal may have a peak-to-peak amplitude greater than about 10 V or less than about 1 V. In various embodiments, driving the sensor electrodes 105 with an absolute capacitive sensing signal comprises modulating the sensor electrodes 105. A resulting signal received while performing absolute capacitive sensing may comprise effect(s) corresponding to one or more absolute capacitive sensing signals, and/or to one or more sources of environmental interference, e.g., other electromagnetic signals. The absolute capacitive sensing signal may be the same or different from the transcapacitive sensing signal used in transcapacitance sensing.

In certain embodiments, the sensor circuitry 104 drives a subset of the sensor electrodes 105 with a guard signal. A sensor electrode 105 driven with a guard signal may be referred to as a guarded sensor electrode or guard electrode. Driving a sensor electrode 105 with a guard signal mitigates a voltage difference between the guarded sensor electrode and a sensor electrode driven with the absolute capacitive sensing signal in parallel. Driving the guard signal onto a first one or more sensor electrodes 105 while driving the sensing signal onto a second one or more sensor electrodes 105 results in little or no change in capacitance between the guarded sensor electrode(s) and the sensor electrode(s) driven with the absolute capacitive sensing signal.

It will be appreciated that the sensor circuitry 104 may drive the sensor electrodes 105 in multiple modes. For example, the sensor circuitry 104 may drive the sensor electrodes 105 in a transcapactive mode during a first time period and an absolute capacitive mode during a second time period. Further, the sensor circuitry 104 may drive the sensor electrodes 105 with multiple versions of a particular mode. For example, the sensor circuitry 104 may drive the sensor electrodes 105 in parallel transcapactive sensing mode during a first period of time and a non-parallel transcapacitive sensing mode during a second period of time. Non-parallel transcapacitive sensing, for example, involves driving either rows or columns with a transcapacitive sensing signal and reading resulting signals from the other of the rows or columns as previously described. Parallel transcapacitive sensing involves both driving and reading electrodes having generally the same orientation (e.g., non-overlapping).

The determination circuit 106 receives the resulting signals from the sensor circuitry 104 and processes the resulting signals to determine changes in capacitive coupling of the sensor electrodes 105. The determination circuit 106 utilizes the changes in capacitive coupling of the sensor electrodes 105 to determine positional information of one or more input objects (e.g., the input object 140) or to determine a change in capacitance for other reason. The determination circuit 106 may perform other functions, such as, for example, measuring the amount of noise present in one or more regions of a sensing area and/or determining whether positional information has been corrupted or degraded by noise. In certain embodiments, the determination circuit 106 may combine resulting signals. For example, the determination circuit 106 subtracts a resulting signal from one receiver electrode from a resulting signal from another receiver electrode to form a differential signal.

In one or more embodiments, measurements of the changes in capacitive coupling determined from the resulting signals received from the sensor electrodes 105 may be utilized by the determination circuit 106 to form a capacitive image. The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 140 in the sensing area of the input device 100. For example, successive capacitive images acquired over successive periods of time can be used to track the motion(s) of one or more input objects entering, exiting, and within the sensing area.

"Positional information" as used herein broadly encompasses absolute position, relative position, velocity, acceleration, and other types of spatial information in zero, one, two or three dimensions as appropriate. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 2:
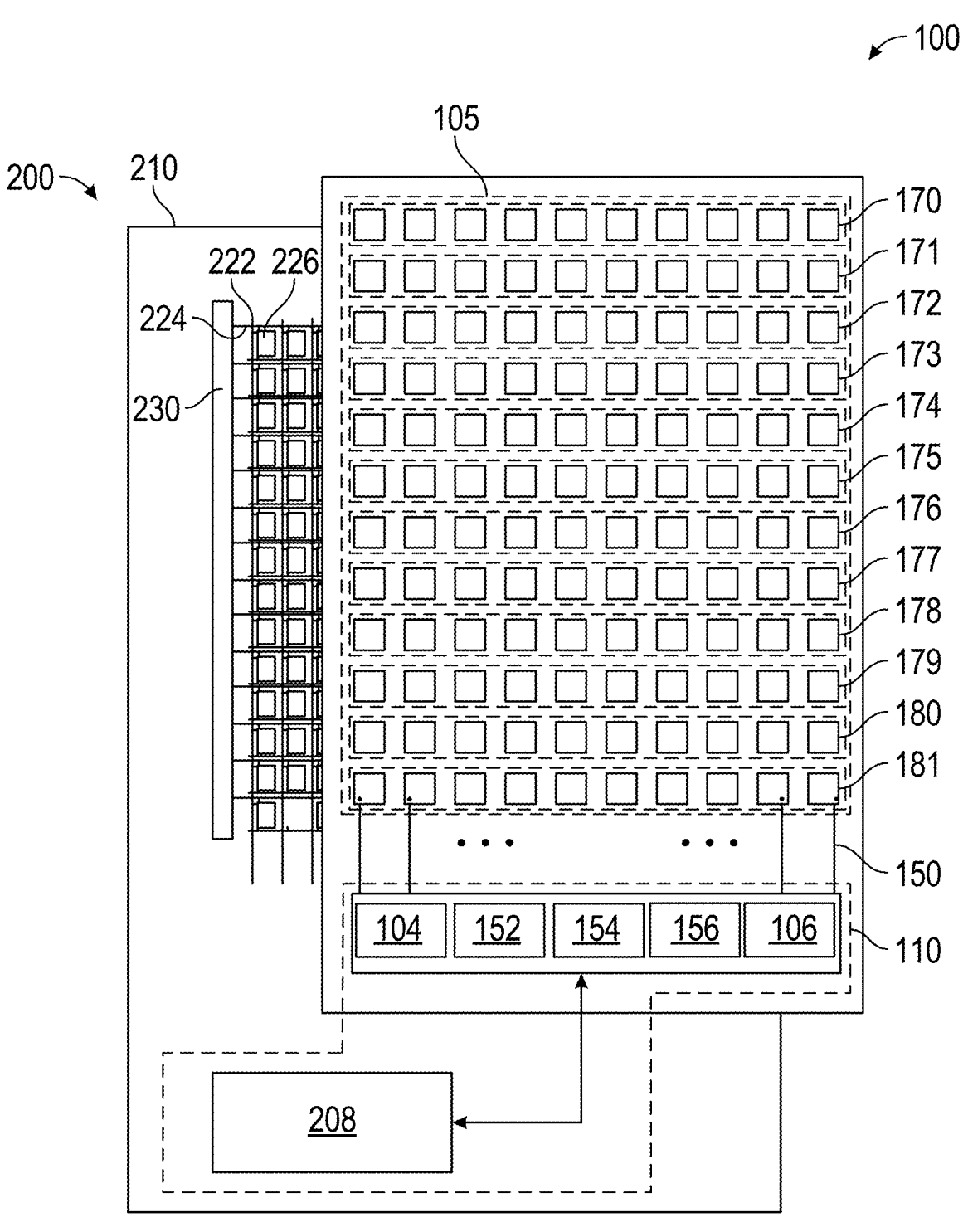
FIG. 2 is a block diagram of an input device with integrated display, according to one or more embodiments.

FIG. 2 illustrates an example of the input device 100 wherein the input device is shown overlapped and/or integrated with a display of a display device 200. The display of the display device 200 may be any suitable type of display such as, for example, light emitting diode (LED), microLED, organic LED (OLED), microOLED, liquid crystal display (LCD), plasma, electroluminescence (EL), or other display technology.

The display device 200 includes a display panel 210 communicatively coupled with a display driver 208 and gate selection circuitry 230. The display panel 210 includes display electrodes that are driven to update subpixel electrodes 226 of the display panel 210. The display electrodes include data lines 222 and gate lines 224, among others. The display driver 208 may be part of the processing system 110 (FIG. 1) or may be a separate component.

The data lines 222 are coupled to the display driver 208 and the gate lines 224 are coupled to the gate selection circuitry 230. Each of the subpixel electrodes 226 is coupled to one of the gate lines 224 and one of the data lines 222. The gate selection circuitry 230 is configured to drive gate select and gate deselect signals onto the gate lines 224 to select (activate) and deselect (deactivate) corresponding subpixels for updating.

The display driver 208 includes display driver circuitry configured to drive the data lines 222 with subpixel data signals to update the selected subpixels electrodes 226 and update the display of the display device 200. For example, the display driver 208 may drive display update signals onto the data lines 222 during corresponding display updating periods.

The display driver 208 is configured to update the subpixel electrodes 226 to update an image displayed on the display panel 210 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 140 Hz, or greater.

The display driver 208, the sensor circuitry 104, the determination circuit 106, the AFEs 152, the ADCs (and/or DACs) 154, and the compensation circuitry 156 may be part of a common processing system (e.g., the processing system 110 forms a touch and display controller). Alternatively, the display driver 208 may be part of a first processing system and the sensor circuitry 104, AFEs 152, the ADCs (and/or DACs) 154, the compensation circuitry 156, and the determination circuit 106 may be part of a second processing system. Further, the display driver 208, the sensor circuitry 104, the AFEs 152, the ADCs (and/or DACs) 154, the compensation circuitry 156, and the determination circuit 106 may be part of a common IC chip. Alternatively, one or more of these components may be disposed in a first IC chip and a second one or more of these components may be disposed on a second IC chip, etc. As an alternative, any of the sensor circuitry 104, AFEs 152, the ADCs (and/or DACs) 154, the compensation circuitry 156, and/or the determination circuit 106 may be implemented in whole or in part by one or more discrete circuits.

In various embodiments, the sensor circuitry 104 is configured to drive the sensor electrodes 105 for capacitive sensing during a capacitive frame at a capacitive frame rate. Further, each capacitive frame may include multiple periods during which different sensor electrodes 105 are operated for capacitive sensing.

The "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or multiple of the display frame rate. Further, the capacitive frame rate may be a rational fraction of the display rate (e.g., 1/2, 2/3, 1, 3/2, 2). In one or more embodiments, the display frame rate may change while the capacitive frame rate remains constant. In other embodiments, the display frame rate may remain constant while the capacitive frame rate is increased or decreased. Alternately, the capacitive frame rate may be unsynchronized from the display refresh rate or the capacitive frame rate may be a non-rational fraction of the display rate to minimize interference "beat frequencies" between the display updating and the input sensing.

In one or more embodiments, capacitive sensing (or input sensing) and display updating may occur during at least partially overlapping periods. For example, the sensor circuitry 104 is configured to operate the sensor electrodes 105 for capacitive sensing while the display driver 208 operates the gate lines 224 and data lines 222 to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

In one or more embodiments, updating the display panel 210 and operating the sensor electrodes 105 for capacitive sensing may occur during non-overlapping periods. For example, updating the display panel 210 may occur during display update periods and operating the sensor electrodes 105 for capacitive sensing may occur during non-display update periods. The non-display update periods may be a blanking period that occurs between the last line of a display frame and the first line of the following display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

Figures 3, 4:
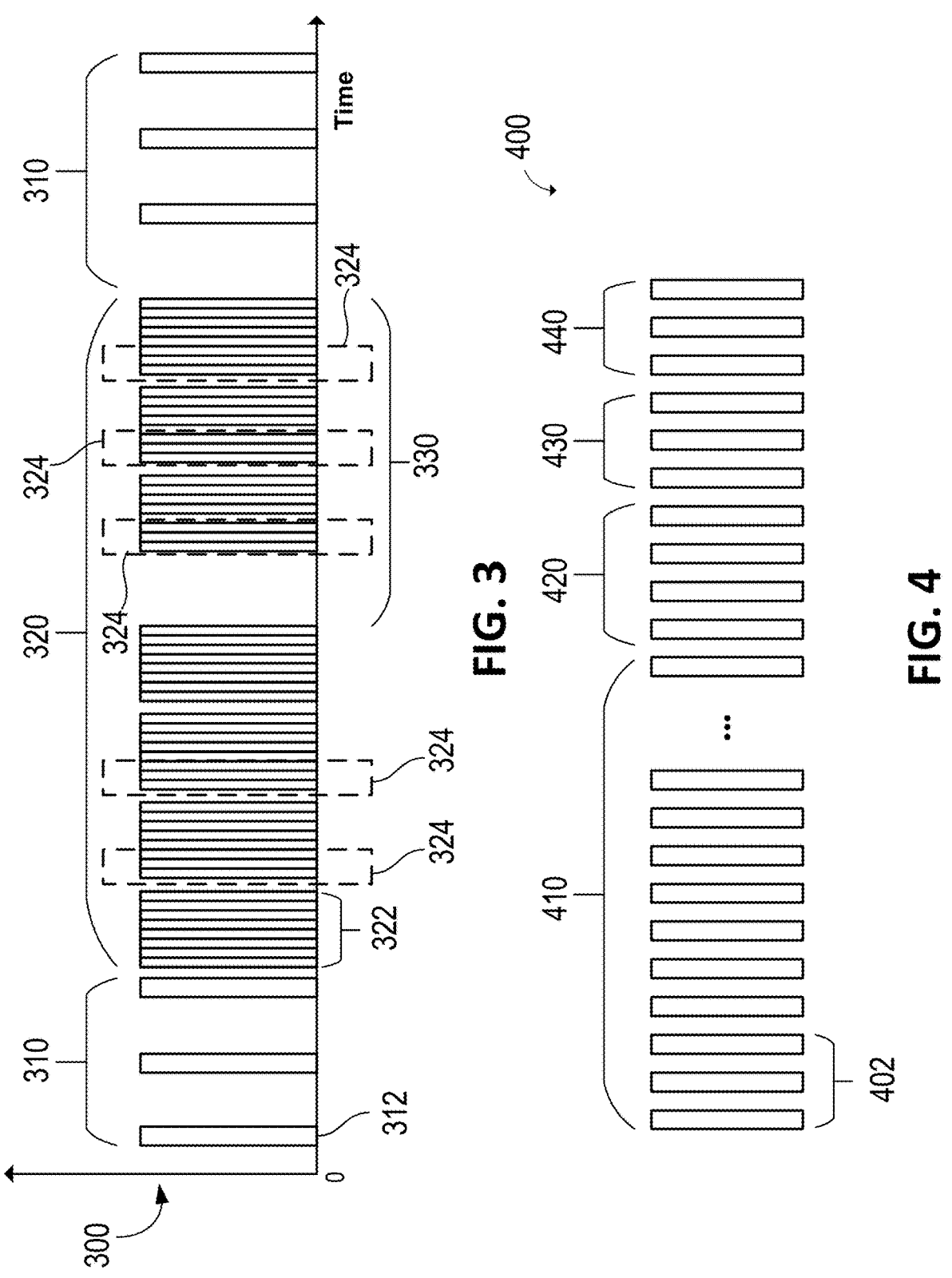
FIG. 3 illustrates an example of sensing signals in various modes according to one or more embodiments.
FIG. 4 illustrates an example of a complete touch frame according to one or more embodiments.

FIG. 3 illustrates an example of sensing signals 300 in various modes in accordance with certain embodiments. In the example of FIG. 3, the sensor circuitry 104 may drive the sensor electrodes 105 to operate in a doze mode 310 or an active mode 320. Doze mode 310 is a low power state, which has much shorter sensing time comparing to active mode 320. The doze mode 310 is a mode used to detect presence of an input object proximate to the touch sensor and upon detection of the input object place the touch sensor in an active state. For example, the sensor circuitry 104 may drive the sensor electrodes 105 to perform sensing with a first sensing duration 312 and at a first rate in doze mode 310, and to performing sensing with a second sensing duration 322 and at a second rate in active mode 320. Each sensing duration 312 may include a few bursts (or sometimes a single burst) to detect a touch. Upon detecting a touch, the processing system 110 may cause the sensor circuitry 104 to transition to operate in active mode 320, such as by starting to generate sensing signals according to the configuration for active mode 320. Each sensing duration 322 may include a plurality of bursts that form a complete touch frame. The sensor circuitry 104 may transition to operate in doze mode 310 if no touch is detected during a waiting period 330. In certain embodiments, the sensor circuitry 104 may be configured to perform touch sensing for a preset number of sensing durations 322 in the waiting period 330.

FIG. 4 illustrates an example of a complete touch frame 400 during active mode 320 in accordance with certain embodiments. The complete touch frame 400 includes a sequence of preconfigured bursts, which may be referred to as a pipelined sensing scheme. Each burst may represent a sensing signal or a set of sensing signals generated by the sensor circuitry 104 at a given time to control all or a subset of sensor electrodes 105 for sensing. The bursts may correspond to various types of sensing, such as, e.g., transcapacitive sensing, absolute capacitive sensing, parallel transcapacitive sensing, noise sensing, etc. For example, in FIG. 4, the pipelined sensing scheme in the complete touch frame 400 may include a plurality of bursts of a first type at the first stage 410 (e.g., transcapacitive), one or more bursts of a second type at the second stage 420 (e.g., absolute capacitive), one or more bursts of a third type at the third stage 430 (parallel transcapacitive), and one or more bursts of a fourth type at the fourth stage 440 (e.g., noise detection).

The method and system herein provide condition checking using a subset of bursts from the sequence of bursts in a complete touch frame and, based on the condition checking result, terminate the process of performing the remaining bursts in the respective touch frame. For example, in FIG. 4, a certain number of bursts (e.g., the first three bursts) from the complete touch frame 400 may be used for condition checking 402. The pipelined sensing scheme of the complete touch frame 400 may be terminated in the middle depending on the condition checking result. In certain embodiments, the sensor circuitry 104 may continue to generate sensing signals based on the bursts from a subsequent burst (e.g., the fourth burst), until it receives an indication (e.g., instruction and/or signal) to terminate the ongoing process. In certain embodiments, the sensor circuitry 104 may pause the generation of sensing signals until it completes the condition checking to decide whether to continue or terminate the remaining bursts from the pipelined sensing scheme. In other embodiments, a hybrid scheme may be adopted under certain circumstances, such as, e.g., depending on various modes in which the input device 100 is operated.

Referring back to FIG. 3, in active mode 320, instead of performing sensing with a complete touch frame 400 for each sensing duration 322, the sensing time may be reduced to a subset of bursts, as indicated by dashed boxes 324. Reducing sensing signals when appropriate can significantly reduce power consumption in active mode 320.

In certain embodiments, one or more conditions may be implemented for terminating touch frames in active mode 320. For example, a first condition may be used to determine whether there is touch presence detected by the sensor electrodes 105. The first condition may be associated with a first threshold. For example, a change in the sensing signal(s) relative to a baseline may be obtained based on the signal(s) sensed from the condition checking. The change in the sensing signal(s) may be compared to the first threshold. If the change in the sensing signal(s) is greater than or equal to the first threshold, the presence of a touch input may be determined. Conversely, if the change in the sensing signal(s) is less than the first threshold, it may be determined that there is no touch presence.

In certain embodiments, a second condition may be used to determine whether a touch presence is static and/or stable, e.g., non-moving finger. The second condition may be associated with a second threshold. For example, a change in the sensing signal(s) relative to a baseline may be obtained based on the signal(s) sensed from the condition checking. The change in the sensing signal(s) may be compared to the second threshold. If the change in the sensing signal(s) is greater than or equal to the second threshold, a change in touch presence may be determined. Conversely, if the change in the sensing signal(s) is less than the first threshold, it may be determined that the touch presence is substantially unchanged from the previous frame. A change in touch presence may be caused by the lifting of an object (e.g., a finger), the object's movement, the detection of another object, or other relevant factors.

In certain embodiments, the first threshold and/or the second threshold may be predefined and/or adjusted based on user input. The first and second threshold may be the same or different. In some examples, the second threshold may be adjusted to enhance sensitivity for detecting the movement of an input object. For example, the second threshold may be set to a smaller value than the first threshold, so that the second threshold can be sensitive to an input object with slow movement.

In the present disclosure, a sub-frame is defined as the detection result from the first one or more bursts in a complete touch frame used for condition checking. For example, as depicted in FIG. 4, the first three bursts from the complete touch frame 400 may be used to obtain a sub-frame for condition checking. In certain embodiments, a sub-frame baseline may be predefined or obtained based on full frame sensing. For example, full frame sensing may be completed by performing the entire set of bursts in the complete touch frame 400, as shown in FIG. 4. The sub-frame baseline may be updated each time the input device 100 completes full frame sensing.

In certain embodiments, a sub-frame for condition checking may indicate detection for part or all of the sensor electrodes 105. The one or more bursts for condition checking may control some or all of the sensor electrodes 105 for detection, for example, by performing transcapacitive sensing. In one example, a single burst may control all the sensor electrodes 105 for detection and used for condition checking. In another example, each burst may control a subset of the sensor electrodes 105 for detection, with one or more bursts used for condition checking.

In a further example, each burst may correspond to a set of driving signals, with each driving signal controlling a row/column of the sensor electrodes 105. The set of driving signals for a burst may include various driving signals, such as those with different polarizations, voltage levels, or other parameters. A subset of adjacent sensor electrodes 105 driven by the same driving signal may form a sub-region for sensing. As such, multiple sub-regions may be created based on the burst with varying driving signals. This configuration may help reduce interference with the display signals. However, touch presence at the borders of the sub-regions may not be detected. That said, one or more bursts in this configuration may be used to obtain a sub-frame corresponding to detection from part of the sensor electrodes 105. Alternatively, a plurality of bursts may be used to obtain a sub-frame corresponding to detection from all of the sensor electrodes 105.

Figures 5A, 5B, 5C:
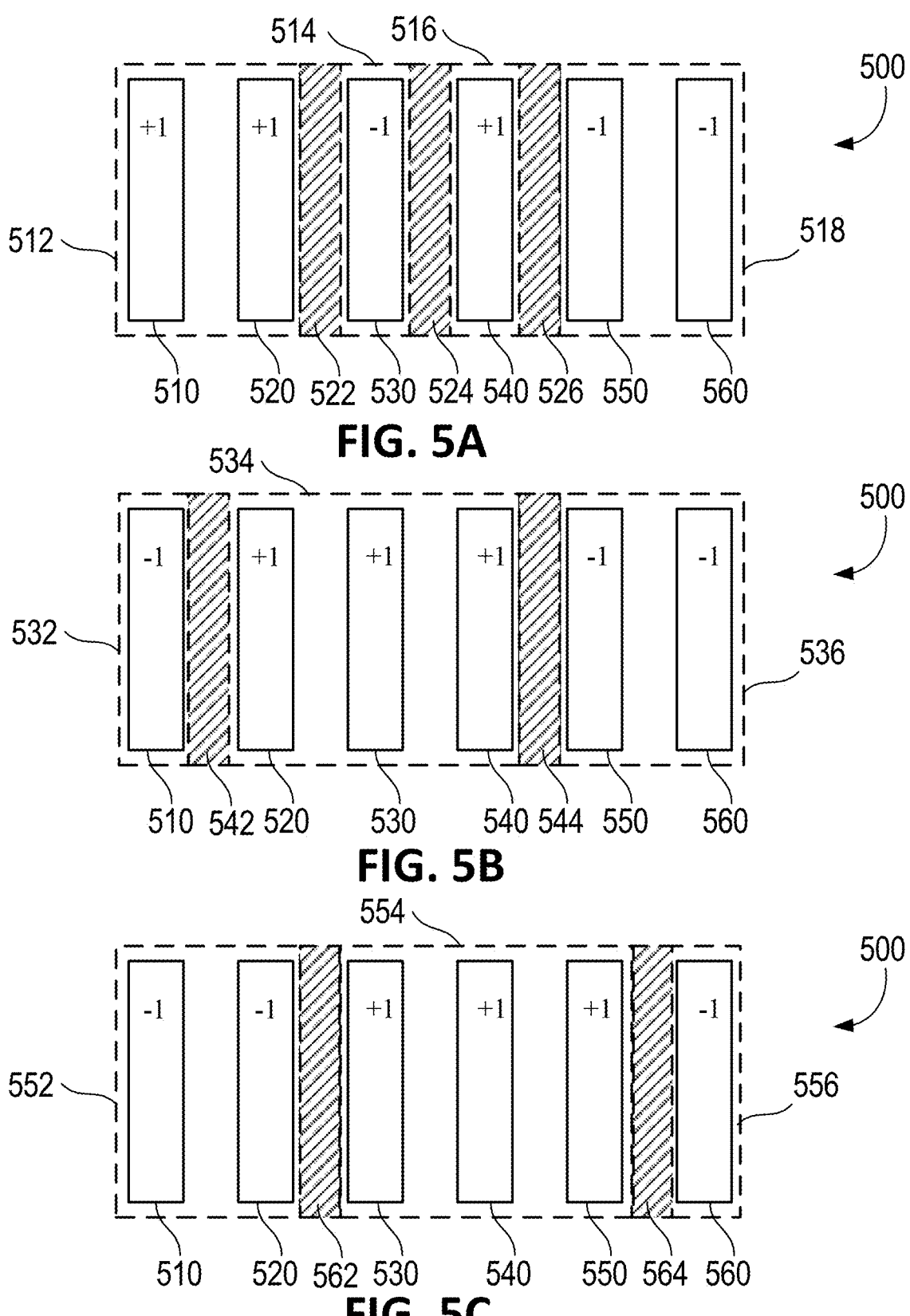
FIGS. 5A-5C illustrate an example of operating a touch sensor with sensor electrodes in accordance with certain embodiments.

FIGS. 5A-5C illustrate an example of operating a touch sensor 500 with sensor electrodes 105 in accordance with certain embodiments. In the example of FIGS. 5A-5C, the sensor electrodes 105 may be operated in a transcapacitive sensing mode. The sensor electrodes 105 (e.g., the transmitter electrodes) are simplified to six columns (e.g., columns 510-560), but it will be understood that any suitable number of columns may be used. FIG. 5A illustrates the columns of the touch sensor 500 operating based on a first burst. FIG. 5B illustrates the columns of the touch sensor 500 operating based on a second burst. FIG. 5C illustrates the columns of the touch sensor 500 operating based on a third burst. Each burst includes a set of driving signals with the same voltage level but opposite polarities, represented by "+1" and "−1." For example, the processing system 110 drives positive transmitter electrodes with a positive sensing signal and drives negative transmitter electrodes with an opposite polarity sensing signal. In certain embodiments, the negative sensing signal may, for example, be the inverse or negative of the positive sensing signal.

Sub-regions associated with the same driving signal are indicated by dashed boxes. Accordingly, FIG. 5A shows four sub-regions in dashed boxes 512, 514, 516, and 518. FIG. 5B shows three sub-regions in dashed boxes 532, 534, and 536. FIG. 5C shows three sub-regions in dashed boxes 552, 554, and 556. In this configuration, the sum of the driving signals in a set corresponding to a burst equals zero. The portion of the touch sensor 500 not detectable in each burst is indicated by shadowed boxes 522, 524, and 526 in FIG. 5A, shadowed boxes 542 and 544 in FIG. 5B, and shadowed boxes 562 and 564 in FIG. 5C. As such, although each burst may cover only a portion of the touch sensor 500, the portion not detected by one burst may be covered by another burst. In this way, the sub-frame generated from the three bursts as shown in FIGS. 5A-5C may encompass the entire area of the touch sensor 500.

Figure 6:
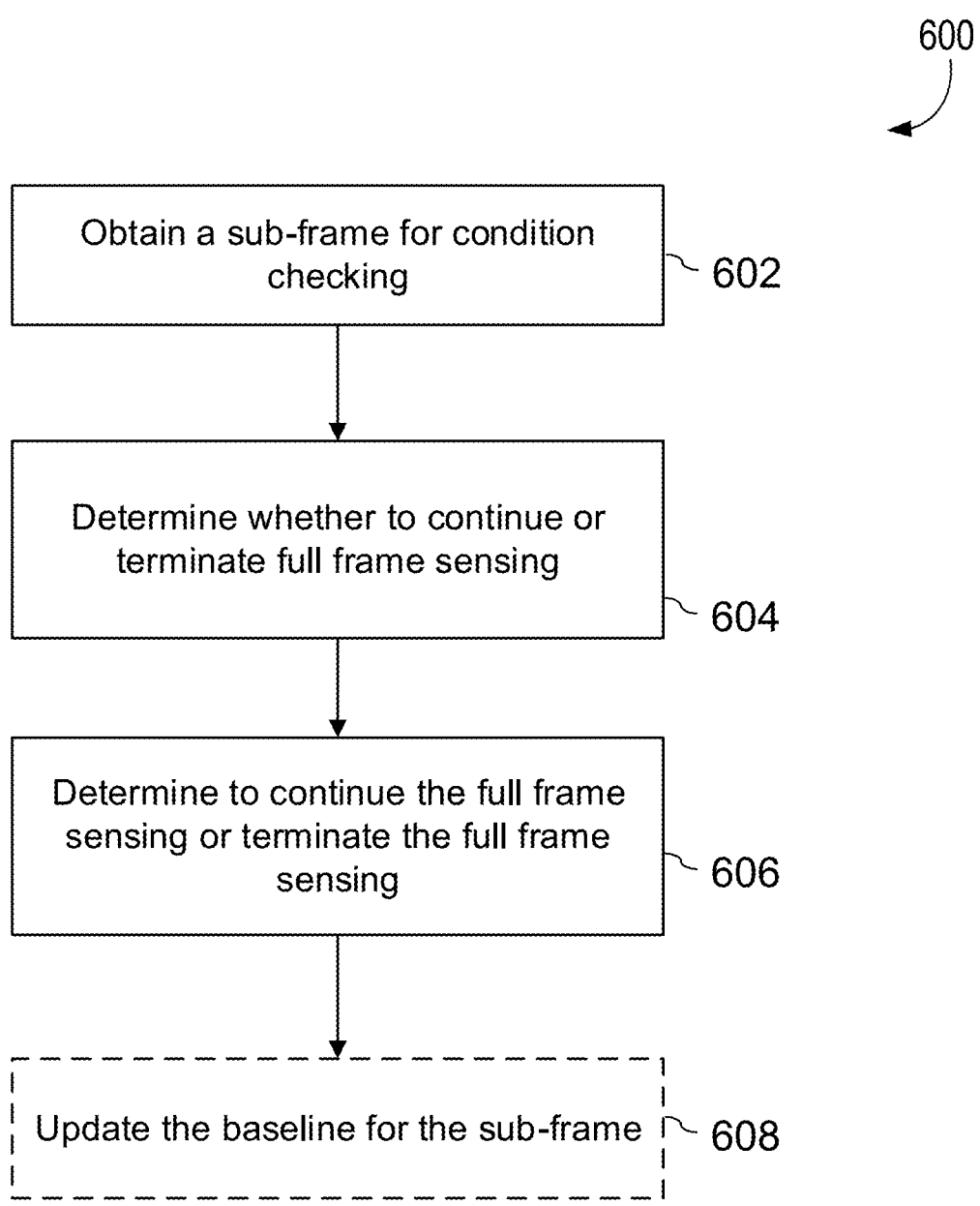
FIG. 6 illustrates a method of operating an input device for power effective touch sensing according to one or more embodiments.

FIG. 6 illustrates a method 600 of operating an input device 100 for touch sensing in accordance with embodiments described herein. It will be understood that the method 600 need not be performed in the order shown, and stages may be concurrently or simultaneously performed, except where otherwise apparent.

At stage 602, the processing system 110 obtains a sub-frame for condition checking. For example, in connection with FIG. 4, the processing system 110, e.g., sensor circuitry 104, drives the transmitter electrodes with sensing signals corresponding to first one or more bursts (e.g., the bursts in 402) in a complete touch frame 400. In a further example, as depicted in FIGS. 5A-5C, three bursts used for condition checking may cover the entire sensing area of the input device 100. It will be understood that any suitable number of bursts may be employed for condition checking.

In certain embodiments, the processing system 110 may generate a capacitive image based on the signals sensed during condition check. The capacitive image may reflect sensed signals from part or all of the sensor electrodes 105. In some examples, the capacitive image may include padded pixels with default values for portions of the sensor electrodes 105 that were not detected during condition checking.

At stage 604, the processing system 110 determines whether to continue or terminate full frame sensing. The processing system 110 determines whether a condition is met for terminating the full frame sensing based on the sub-frame obtained from stage 602.

In certain embodiments, the processing system 110 may obtain a change in the input device 100 based on the sub-frame and a baseline. The baseline may be associated with a previous touch frame. For example, as discussed above, the baseline may be determined or updated based on full frame sensing that was performed previously.

The processing system 110 may compare the change in the input device 100 to one or more conditions to determine whether to continue or terminate the current full frame sensing. A first condition may be used when there is no touch presence on the input device 100, based on the previous sensing operation (e.g., as indicated by the latest full frame and/or the baseline). A second condition may be used when there is touch presence on the input device 100. The processing system 110 may obtain the change in the input device 100 by subtracting the baseline from the sub-frame and then perform the comparison by selecting the appropriate condition based on the specific circumstances.

At stage 606, the processing system 110 determines to continue the full frame sensing or terminate the full frame sensing. For example, the processing system 110 may decide to continue the full frame sensing if the comparison at stage 604 indicates the change in the input device 100 is greater than or equal to the threshold defined by the corresponding condition. The processing system 110 may decide to terminate the full frame sensing if the comparison at stage 604 indicates the change in the input device 100 is less than the threshold defined by the corresponding condition.

At stage 608, the processing system 110 optionally updates the baseline for the sub-frame. For example, when full frame sensing is performed at stage 606, the processing system 110 may carry out the update of the sub-frame. However, if full-frame sensing is terminated at stage 606, the processing system 110 may not perform the update. It will be understood that any suitable conditions and/or parameters may be used to determine whether the baseline for the sub-frame should be updated at this stage. As such, the baseline may be maintained and/or dynamically updated throughout the operation.

The method 600 may be repeated over multiple capacitive frames. For example, as discussed in connection with FIG. 3, the method 600 may reduce sensing time in active mode 320, thereby saving power.

Figure 7A:
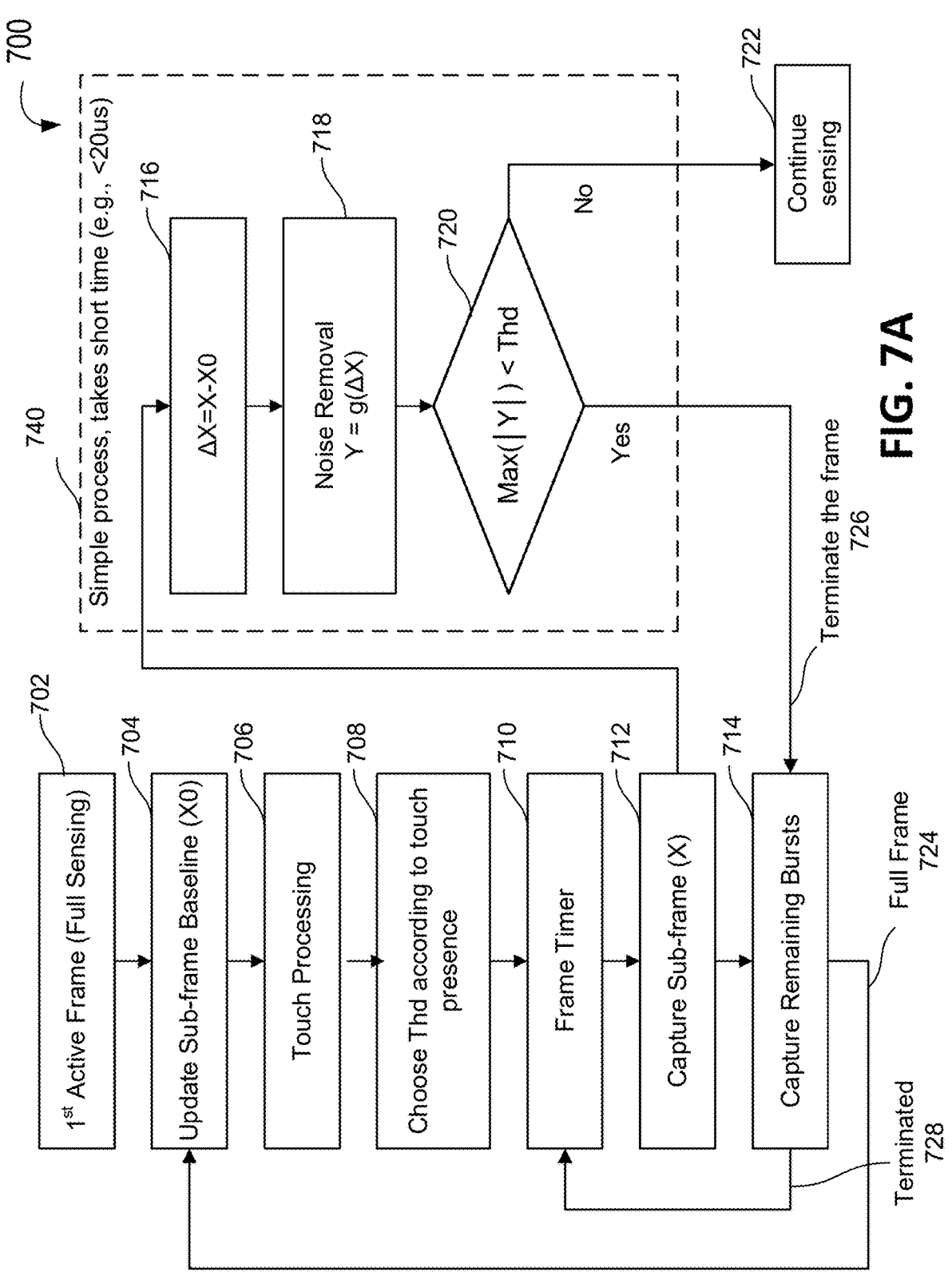
FIG. 7A illustrates a method of operating an input device for power effective touch sensing according to one or more embodiments.

FIG. 7A illustrates a method 700 of operating an input device 100 for touch sensing in accordance with embodiments described herein. It will be understood that the method 700 need not be performed in the order shown, and stages may be concurrently or simultaneously performed, except where otherwise apparent. Furthermore, one or more stages in the method 700 may be omitted. As but one example, when noise removal is not performed, the corresponding step may be omitted.

At stage 702, the processing system 110, e.g., sensor circuitry 104, drives the transmitter electrodes with sensing signals to obtain a first active frame based on full sensing. For example, in connection with FIG. 3, the first active frame corresponds to the sensing duration 322 in active mode 320. For example, the first active frame may correspond to the first sensing duration 322 in active mode 320. Additionally, and/or alternatively, the first active frame may correspond to a sensing operation performed in a previous sensing duration 322 in active mode 320. The processing system 110 drives the transmitter electrodes with sensing signals to complete the entire set of bursts in the complete touch frame 400 as depicted in FIG. 4. The processing system 110 obtains a full frame based on signals from the full sensing.

At stage 704, the processing system 110 updates the sub-frame baseline. The sub-frame baseline is represented by X0. In certain embodiments, the sub-frame baseline is updated each time the input device 100 completes full frame sensing.

At stage 706, the processing system 110 processes the first active frame to detect one or more input objects 140 or other condition in the sensing area of the input device 100, as described in connection with FIG. 1.

At stage 708, the processing system 110 chooses a threshold (referred to as "Thd" in FIG. 7A) according to touch presence. For example, when detecting no touch presence at stage 706, the processing system 110 determines a first threshold to be associated with the current sub-frame baseline (X0). When detecting touch presence at stage 706, the processing system 110 determines a second threshold to be associated with the current sub-frame baseline (X0).

At stage 710, the processing system 110 controls the sensor circuitry 104 to wait for a time period according to a preset frame timer. After the prescribed time period, the processing system 110 instructs the sensor circuitry 104 to start the next frame sensing.

At stage 712, the processing system 110 instructs the sensor circuitry 104 to capture a sub-frame (referred to as "X") for the current frame sensing. For example, in connection with FIGS. 3-5, the processing system 110 may utilize signals sensed from the first one or more bursts in the complete touch frame 400 to obtain the sub-frame (X).

At stage 714, the processing system 110 controls the sensor circuitry 104 to continue capturing remaining bursts as preconfigured in the full sensing.

Concurrently, through parallel processing, the processing system 110 performs condition checking through stages 716 to 720, as indicated in dashed box 740. The condition checking is a simple process that takes a short time period in comparison to a full sensing frame (e.g., less than 20 microseconds).

At stage 716, the processing system 110 calculates a difference between the sub-frame (X) and the sub-frame baseline (X0), which is referred to as ΔX.

At stage 718, the processing system 110 may perform optional noise removal to enhance the result from stage 716. The operation may be represented by $Y=g(\Delta X)$, where Y represents the difference after noise removal, and g( ) represents the noise removal function. In certain embodiments, Y may include a set of values represented by amplitude and phase.

At stage 720, the result from stage 718 is compared to the threshold determined at stage 708. For example, the processing system 110 may perform the comparison based on Max(|Y|)<Thd, where the maximum value is determined from the amplitude of the set of values in Y and the compared to the threshold.

When determining that the maximum value is greater than or equal to the threshold at stage 720, the processing system 110 determines to continue sensing, as indicated at stage 722. For example, the processing system 110 may determine not to interrupt the ongoing sensing at stage 714, thereby obtaining a full frame 724. When determining that the maximum value is less than the threshold at stage 720, the processing system 110 determines to terminate the ongoing sensing at stage 714, as indicated by the arrow 726, and advance to stage 710 to wait for the next frame timer to elapse, as indicated by the arrow 728. For example, the processing system 110 may generate a trigger signal to interrupt the sensor circuitry 104 from generating the current burst and/or instruct the sensor circuitry 104 to stop generating the remaining bursts.

When obtaining a full frame through a full sensing (e.g., at stage 714), the processing system 110 may advance to stage 704 to update the sub-frame baseline (X0).

The method 700 may be repeated over multiple capacitive frames.

Figure 7B:
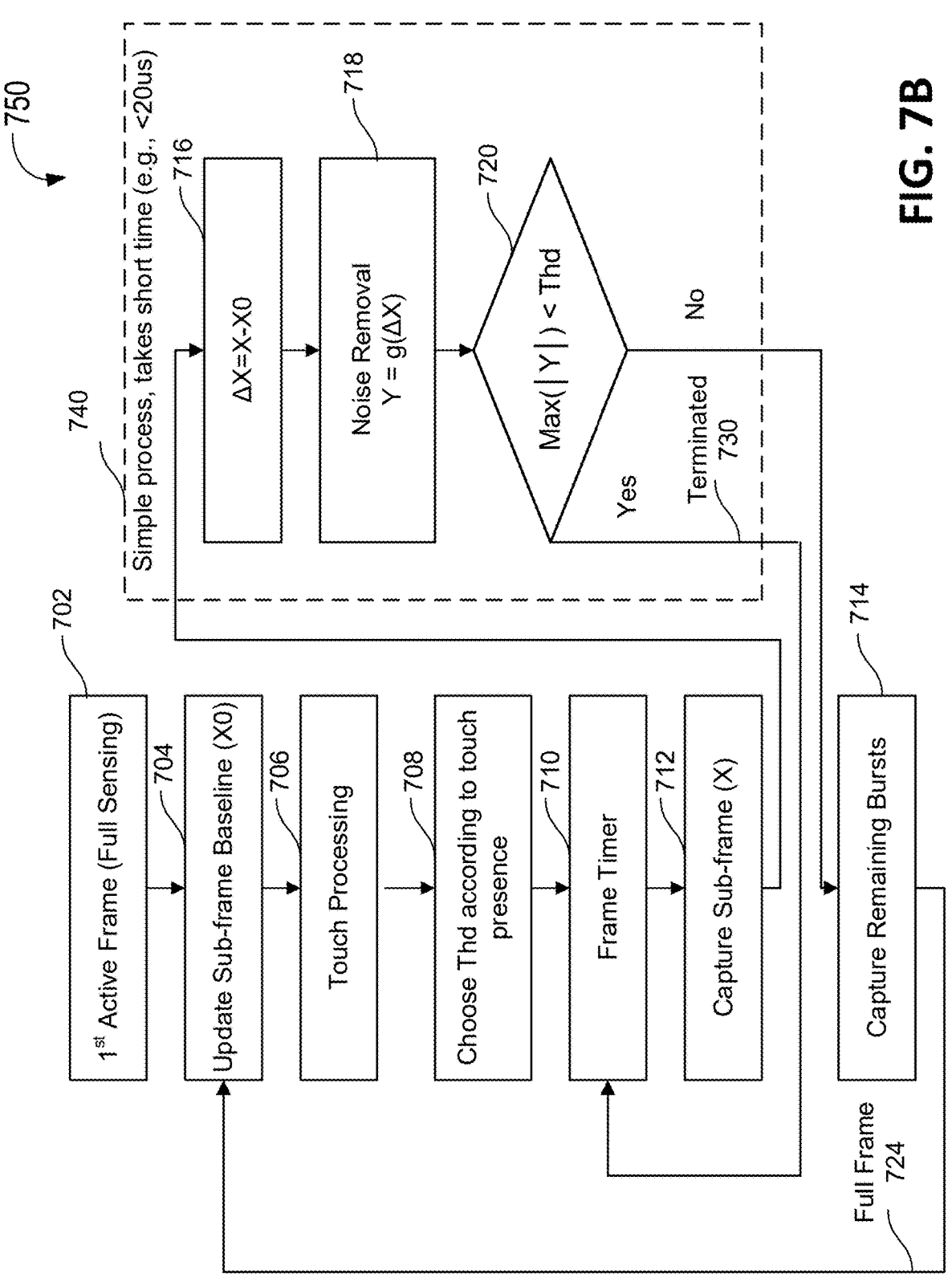
FIG. 7B illustrates a method of operating an input device for power effective touch sensing according to one or more embodiments.

FIG. 7B illustrates a method 750 of operating an input device 100 for power effective touch sensing in accordance with embodiments described herein. It will be understood that the method 750 need not be performed in the order shown, and stages may be concurrently or simultaneously performed, except where otherwise apparent. Furthermore, one or more stages in the method 750 may be optional. For example, when noise removal is not performed, the corresponding step may be omitted.

Stages 702-712 and 716-720 in the method 750 may be similar to stages 702-712 and 716-720 in the method 700. According, the description corresponding to these stages is not repeated.

After capturing the sub-frame (X) at stage 712, in the method 750, the processing system 110 pauses the operation of capturing the remaining bursts at stage 714 to perform condition checking through stages 716-720, as indicated in dashed box 740. Similarly, the condition checking is a simple process that takes a short time period (e.g., less than 20 microseconds).

Similarly, at stage 720, the result from stage 718 is compared to the threshold determined at stage 708. For example, the processing system 110 may perform the comparison based on Max(|Y|)<Thd, where the maximum value is determined from the amplitude of the set of values in Y and the compared to the threshold.

When determining that the maximum value is greater than or equal to the threshold at stage 720, the processing system 110 determines to continue capturing the remaining bursts at stage 714, thereby obtaining a full frame 724. For example, the processing system 110 may generate a trigger signal to the sensor circuitry 104 to continue generating the next burst and/or instruct the sensor circuitry 104 to generate the remaining bursts. After obtaining a full frame 724 through a full sensing (e.g., at stage 714), the processing system 110 may advance to stage 704 to update the sub-frame baseline (X0). When determining that the maximum value is less than the threshold at stage 720, the processing system 110 determines to terminate the full sensing and advance to stage 710 to wait for the next frame timer to elapse, as indicated by the arrow 730. For example, the processing system 110 may instruct the sensor circuitry 104 to stop generating the remaining bursts.

Similar to the method 700, the method 750 may be repeated over multiple capacitive frames.

The method 700 may maintain the same sensing duration as without using the method. As such, the implementation of the method 700 may not impact the maximum frame rate. Conversely, the method 750 may result in a longer processing time due to the time required for condition checking and the additional time needed to configure the remaining bursts and/or restart the sensing pipeline. However, the method 750 may further reduce power consumption whenever an instance of full sensing is terminated.

In certain embodiments, the processing system 110 may determine to always perform full frame sensing under certain circumstances. For example, when the processing system 110 determines that the condition check fails under certain conditions, such as, e.g., noisy conditions.

The following example calculates an example of active power saving estimation based a set of assumptions for an example system and user touch behavior. In this example, the system is configured to perform each instance of full frame sensing with a set of 28 bursts. The system captures a sub-frame based on the first three bursts from the full sensing. The time to terminate a burst equals to 0.5 burst, and the time from the last touch to idle (e.g., the waiting period 330 as shown in FIG. 3) is set to two seconds. The active frame rate is 120 Hertz.

User touch behavior is assumed as follows. The touch speed is 120 taps/swipes per minute (or two taps/swipes per second). Each touch down time equals to ten frames (e.g., ten instances of sensing duration 322 in active mode 320). The user touches are assumed to be equally split between taps and swipes. Assume that 50% of the tap frames will be terminated after condition check, while 0% swipe frames will be terminated after condition check.

With the foregoing assumptions, the assumed user behavior using the example system will result in 3,360 bursts per second, when the method disclosed herein (e.g., the method 700 or 750) is not used to terminate suitable frame sensing instances. In contrast, the method disclosed herein will result in 788 bursts performed per second. In the foregoing example, the system may achieve overall effective active power saving of over 75% in the assumed usage scenario.

In view of the foregoing, it will be appreciated that exemplary embodiments of the present disclosure enhance power savings during operation, while at the same time provide accurate detection of input objects.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A touch sensor comprising:
   a plurality of sensor electrodes configured to perform touch sensing for each sensing duration of a plurality of sensing durations in an active mode based on a set of sensing signals generated by a sensor circuit, wherein the active mode is entered from a doze mode in response to detecting a touch presence; and
   the sensor circuit configured to:
      obtain a sub-frame based on resulting signals received from the plurality of sensor electrodes based on a subset of sensing signals in the sensing duration;
      determine whether the sub-frame meets a condition to terminate the touch sensing for the sensing duration, the condition corresponding to a baseline and a threshold;
      in response to determining that the sub-frame meets the condition to terminate the touch sensing for the sensing duration, terminate the touch sensing for the sensing duration;
      wait for a time period according to a preset timer; and
      after the preset timer elapses, generate sensing signals for the plurality of sensor electrodes to perform touch sensing for a next sensing duration based on the set of sensing signals.

2. The touch sensor according to claim 1, wherein the sensor circuit is further configured to:
   obtain a change by subtracting the baseline from the sub-frame;
   compare the change with the threshold to determine whether the sub-frame meets the condition to terminate the touch sensing for the sensing duration; and
   based on the change being less than the threshold, determine that the sub-frame meets the condition to terminate the touch sensing for the sensing duration.

3. The touch sensor according to claim 2, wherein the condition is a first condition corresponding to a first threshold and a first baseline, wherein the first baseline indicates no touch presence prior to the sensing duration, and wherein the first threshold is used to determine there is touch presence during the sensing duration.

4. The touch sensor according to claim 3, wherein the sensor circuit is further configured to:
   obtain a first change by subtracting the first baseline from the sub-frame;
   compare the first change with the first threshold to determine whether the sub-frame meets the condition to terminate the touch sensing for the sensing duration;
   based on the first change being less than the first threshold, determine that the sub-frame meets the condition to terminate the touch sensing for the sensing duration; and
   based on the first change being greater than or equal to the first threshold, determine to continue the touch sensing for the sensing duration.

5. The touch sensor according to claim 2, wherein the condition is a second condition corresponding to a second threshold and a second baseline, wherein the second baseline indicates touch presence prior to the sensing duration, and wherein the second threshold is used to determine there is no change to the touch presence during the sensing duration.

6. The touch sensor according to claim 5, wherein the sensor circuit is further configured to:

obtain a second change by subtracting the second baseline from the sub-frame;

compare the second change with the second threshold to determine whether the sub-frame meets the condition to terminate the touch sensing for the sensing duration; and based on the second change being less than the second threshold, determine that the sub-frame meets the condition to terminate the touch sensing for the sensing duration; and based on the second change being greater than or equal to the second threshold, determine to continue the touch sensing for the sensing duration.

7. The touch sensor according to claim 1, wherein the sensor circuit is further configured to:

in response to determining that the sub-frame does not meet the condition to terminate the touch sensing for the sensing duration, continue the touch sensing for the sensing duration;

generate a full touch frame based on resulting signals from the plurality of sensor electrodes based on the set of sensing signals during the sensing duration; and update the baseline corresponding to the condition based on the full touch frame.

8. The touch sensor according to claim 1, wherein the sensor circuit is further configured to:

generate subsequent sensing signals in the set of sensing signals during the sensing duration, while determining whether the sub-frame meets the condition to terminate the touch sensing for the sensing duration; and in response to determining that the sub-frame meets the condition to terminate the touch sensing for the sensing duration, stop generating remaining sensing signals in the set of sensing signals for the sensing duration.

9. The touch sensor according to claim 1, wherein the sensor circuit is further configured to:

stop generating subsequent sensing signals in the set of sensing signals during the sensing duration, while determining whether the sub-frame meets the condition to terminate the touch sensing for the sensing duration; and after determining that the sub-frame does not meet the condition to terminate the touch sensing for the sensing duration, generate remaining sensing signals in the set of sensing signals for the sensing duration.

10. An input device comprising:

a display; and a touch sensor comprising:

a plurality of sensor electrodes configured to perform touch sensing for each sensing duration of a plurality of sensing durations in an active mode based on a set of sensing signals generated by a sensor circuit, wherein the active mode is entered from a doze mode in response to detecting a touch presence; and the sensor circuit configured to:

obtain a sub-frame based on resulting signals received from the plurality of sensor electrodes based on a subset of sensing signals in the sensing duration;

determine whether the sub-frame meets a condition to terminate the touch sensing for the sensing duration, the condition corresponding to a baseline and a threshold;

in response to determining that the sub-frame meets the condition to terminate the touch sensing for the sensing duration, terminate the touch sensing for the sensing duration;

wait for a time period according to a preset timer; and after the preset timer elapses, generate sensing signals for the plurality of sensor electrodes to perform touch sensing for a next sensing duration based on the set of sensing signals.

11. The input device according to claim 10, wherein the sensor circuit is further configured to:

obtain a change by subtracting the baseline from the sub-frame;

compare the change with the threshold to determine whether the sub-frame meets the condition to terminate the touch sensing for the sensing duration; and based on the change being less than the threshold, determine that the sub-frame meets the condition to terminate the touch sensing for the sensing duration.

12. The input device according to claim 11, wherein the condition is a first condition corresponding to a first threshold and a first baseline, wherein the first baseline indicates no touch presence prior to the sensing duration, and wherein the first threshold is used to determine there is touch presence during the sensing duration, or wherein the condition is a second condition corresponding to a second threshold and a second baseline, wherein the second baseline indicates touch presence prior to the sensing duration, and wherein the second threshold is used to determine there is no change to the touch presence during the sensing duration.

13. The input device according to claim 12, wherein the sensor circuit is further configured to:

obtain a first change by subtracting the first baseline from the sub-frame;

compare the first change with the first threshold to determine whether the sub-frame meets the condition to terminate the touch sensing for the sensing duration;

based on the first change being less than the first threshold, determine that the sub-frame meets the condition to terminate the touch sensing for the sensing duration; and based on the first change being greater than or equal to the first threshold, determine to continue the touch sensing for the sensing duration.

14. The input device according to claim 12, wherein the sensor circuit is further configured to:

obtain a second change by subtracting the second baseline from the sub-frame;

compare the second change with the second threshold to determine whether the sub-frame meets the condition to terminate the touch sensing for the sensing duration; and based on the second change being less than the second threshold, determine that the sub-frame meets the condition to terminate the touch sensing for the sensing duration; and based on the second change being greater than or equal to the second threshold, determine to continue the touch sensing for the sensing duration.

15. The input device according to claim 10, wherein the sensor circuit is further configured to:

in response to determining that the sub-frame does not meet the condition to terminate the touch sensing for the sensing duration, continue the touch sensing for the sensing duration;

generate a full touch frame based on resulting signals from the plurality of sensor electrodes based on the set of sensing signals during the sensing duration; and update the baseline corresponding to the condition based on the full touch frame.

16. The input device according to claim 10, wherein the sensor circuit is further configured to:

generate subsequent sensing signals in the set of sensing signals during the sensing duration, while determining whether the sub-frame meets the condition to terminate the touch sensing for the sensing duration; and in response to determining that the sub-frame meets the condition to terminate the touch sensing for the sensing duration, stop generating remaining sensing signals in the set of sensing signals for the sensing duration.

17. The input device according to claim 10, wherein the sensor circuit is further configured to:

stop generating subsequent sensing signals in the set of sensing signals during the sensing duration, while determining whether the sub-frame meets the condition to terminate the touch sensing for the sensing duration; and after determining that the sub-frame does not meet the condition to terminate the touch sensing for the sensing duration, generate remaining sensing signals in the set of sensing signals for the sensing duration.

18. A method for touch sensing during for each sensing duration of a plurality of sensing durations in an active mode corresponding to a set of sensing signals, the active mode entered from a doze mode in response to detecting a touch presence, comprising:

driving a plurality of sensor electrodes based on the set of sensing signals;

obtaining a sub-frame based on resulting signals received from the plurality of sensor electrodes based on a subset of sensing signals in the sensing duration;

determining whether the sub-frame meets a condition to terminate the touch sensing for the sensing duration, the condition corresponding to a baseline and a threshold;

in response to determining that the sub-frame meets the condition to terminate the touch sensing for the sensing duration, terminating the touch sensing for the sensing duration;

waiting for a time period according to a preset timer; and after the preset timer elapses, generating sensing signals for the plurality of sensor electrodes to perform touch sensing for a next sensing duration based on the set of sensing signals.

19. The method according to claim 18, further comprising:

obtaining a change by subtracting the baseline from the sub-frame;

comparing the change with the threshold to determine whether the sub-frame meets the condition to terminate the touch sensing for the sensing duration; and based on the change being less than the threshold, determining that the sub-frame meets the condition to terminate the touch sensing for the sensing duration.

20. The method according to claim 19, wherein the condition is a first condition corresponding to a first threshold and a first baseline, wherein the first baseline indicates no touch presence prior to the sensing duration, and wherein the first threshold is used to determine there is touch presence during the sensing duration.

* * * * *